Patented Aug. 12, 1947

2,425,605

UNITED STATES PATENT OFFICE 2,425,605

SELSYN CONTROLLED ELECTRIC MOTOR SYSTEM

Martin A. Edwards, Schenectady, N. Y., assignor to General Electric Company, a corporation of New York Application October 1, 1935, Serial No. 43,002

13 Claims. (Cl. 172—239)

1

This invention relates to remote control systems, more particularly to follow-up systems and the like for causing an object to move into positional agreement with a pilot device, and it has for an object the provision of a simple, reliable and improved system of this character.

More specifically, the invention relates to follow-up control systems in which electrical transmitting and receiving devices are utilized for controlling the driving means for the driven object, and a more specific object of the invention is the provision of a follow-up system of this type in which means are provided for supplying a greater amount of power for controlling the driving means than can be supplied through the transmitter. This is important in applications in which more than one receiving device is connected to the same transmitting device.

In carrying the invention into effect in one form thereof, means are provided for driving a movable object into positional agreement with a pilot device. These driving means are controlled by a transmitting device having a single circuit winding energized from a source of single phase voltage and an inductively related poly-circuit winding, together with a receiving device having a poly-circuit winding energized from the single phase source and an inductively related poly-circuit winding connected to the poly-circuit winding of the transmitting device. The transmitting and receiving devices are responsive to positional disagreement of the pilot device and driven object to cause the driving means to restore the driven object to positional correspondence with the pilot device.

In illustrating the invention in one form thereof, it is shown as embodied in a system in which a gun is caused to follow and move into positional correspondence with a telescope.

For a better and more complete understanding of the invention, reference should now be had to the following specification and to the accompanying drawing, in which Fig. 1 is a simple diagrammatical illustration of an embodiment of the invention and Fig. 2 is a modification.

Referring now to the drawing, an object, such as a gun 10, is rotated in train in positional agreement with a control or pilot device represented as a telescope 11. The gun 10 is driven by any suitable driving means such for example as the direct current electric motor 12 to the drive shaft of which the gun mounting platform is connected by suitable reduction gearing 13, 14. Direct current is supplied to the armature of this motor by any suitable means such for example as the

2 electric valve apparatus 15 illustrated as comprising a pair of electric valves 16 for supplying direct current in one direction to the armature of the motor 12 and a second pair of electric valves 17 for supplying direct current to the armature in the reverse direction. The electric valves are in turn supplied from a suitable source of alternating voltage, represented by the two supply lines 18 through a suitable supply transformer 19, the primary winding of which is connected across the supply source 18 and the secondary windings of which are connected to the anodes of the valves as illustrated. The direct current motor 12 is provided with a separately excited field winding 20 which is supplied from any suitable separate source of direct current such as that represented by the two supply lines 21.

Although the electric valves may be of any suitable type, they are preferably of the three-electrode type, into the envelope of which a small quantity of an inert gas, such for example as mercury vapor is introduced after exhaust; the presence of the mercury vapor within the tube serving to change the usual electronic discharge into an arc stream thereby constituting the tubes grid controlled arc rectifiers.

The average value of the current flowing in the anode circuit of electric valves of this character can be varied by varying the phase relationship between the voltages applied to the grids and to the anodes respectively. When the grid voltage is substantially in phase with the anode voltage, the current flowing in the anode circuit is maximum, and when the grid voltage is lagging with respect to the anode voltage by a predetermined amount, usually more than 90°, the current flowing in the anode circuit is substantially zero. For intermediate phase relationships, the current flow has corresponding intermediate values.

Alternating voltage is supplied to the grids of the electric valves 16 and 17 by means of grid transformers 22 and 23 respectively, the primary windings of which are connected in series relationship with the secondary winding of a grid biasing transformer 24, one terminal of the primary winding of which is connected to an intermediate tap of the primary winding of the supply transformer 19 and the other terminal of which is connected to a common point between a resistance 25 and an inductance 26 connected across the supply source 18. This connection of the primary winding of the biasing transformer serves to derive a voltage for the grid or input circuit of the electric valves which is approximately 90° lagging with respect to the anode voltage so that both pairs of valves are deenergized and supply no current to the armature of the motor 12.

For the purpose of varying this phase relationship of the grid and anode voltages, a component voltage is supplied to the grid or input circuit by means of a transformer 27, one terminal of the secondary winding of which is connected to the common point between the primary windings of the grid transforomers 22 and 23 and the opposite terminal of the secondary winding of which is connected to a mid-point of the secondary winding of the bias transformer 24. This component voltage is substantially in phase with the anode voltage of one pair of valves and therefore, of course, substantially 180° out of phase with the anode voltage of the other pair of valves. Thus, it will be seen that by varying the magnitude of this component voltage, the phase relationship of the resultant grid voltage, i. e., the vectoral sum of the component voltage and the grid bias voltage may be varied as desired and likewise, the magnitude of the current supplied to the electric motor 12 is correspondingly varied. As will be observed, the primary winding of the transformer 27 is connected to the supply source 18 through a transformer 28. For the purpose of varying the magnitude of the component voltage supplied to the grid of the electric valve apparatus, the primary winding of the transformer 27 is also conneeted to the supply source 18 through suitable rotary induction apparatus comprising a transmitting device 29 and a receiving device 30, respectively, connected to the pilot device 11 and the driven object 10.

The transmitting device 29 comprises a rotor member provided with a single circuit winding 29a and a stator member provided with a distributed poly-circuit winding 29b, which is physically similar to a poly-phase winding. The single circuit rotor winding 29a is connected through slip rings 31 and a transformer 32 to the supply source 18. For the purpose of rotating the rotor winding when the telescope 11 is rotated in train, the rotor member is connected to the telescope through gearing 33 which has the same ratio as the gearing 14. The receiving device 30 has a stator member which is provided with a distributed polycircuit winding 30a and a rotor member which is also provided with a distributed poly-circuit winding 30b. These windings 30a and 30b are similar to each other and to the poly-circuit winding 29b of the transmitting device, i. e. they are physically similar to the poly-phase winding of a poly-phase dynamo electric machine.

As shown, the terminals of the stator winding 29b are connected to corresponding terminals of the stator winding of the receiving device 30a and the terminals of two legs of the rotor winding 30b are connected through slip rings 34 and 35 to opposite terminals of the secondary winding of the transformer 28 whilst the third leg is connected through slip ring 36 to one terminal of the primary winding of the transformer 27, the opposite terminal of which is connected to an intermediate point of the secondary winding of the transformer 28.

The rotor member is connected to the driven object, i. e. the gun 10, through driving connections comprising the shaft 37 and the gearing 14, which as previously pointed out has the same ratio as the gear 33. Suitable clutching mechanism 38 is interposed in these driving connections for the purpose of disconnecting the receiving device from the driven object when it is desired to operate the transmitting and receiving devices 29 and 30 as an indicating system without controlling the motor 12.

The primary winding 29a of the transmitter 29, when energized, produces an alternating magnetic field, by means of which a voltage is induced in the stator winding 29b thereby causing current to flow in the stator winding 30a of the receiver 30 and in turn producing an alternating magnetic field by means of which voltages are induced in the separate legs of the windings 30b. When the winding leg 30c of the rotor winding of the receiving device 30 is at right angles with the axis of the magnetic field produced by the primary winding 30a, no voltage is induced in the winding leg 30c. Voltages induced in the winding legs 30d and 30e are substantially equal and in the direction represented by the arrows. The constants of the transformer 28 are such that the voltages induced in the separate halves of the secondary winding are substantially equal and opposed to the voltages induced in the winding legs 30d and 30e. Therefore, the voltage of the mid-tap 28a is equal to the voltage of the Y-point of the winding 30b and, consequently, the voltage between these two points is zero and since the voltage of the winding leg 30c is zero, the voltage impressed across the primary winding of the transformer 27 is zero. Under this condition, the electric valve apparatus is deenergized and supplies no current to the electric motor 12 and the system is, therefore, in correspondence and at rest.

With the above understanding of the apparatus and its organization in the completed system, the operation of the system itself will readily be understood from the following detailed description:

Rotation of the telescope 11 produces a corresponding rotation of the axis of the magnetic field of the stator winding of the receiving device 30. As a result of this change in the position of the magnetic field, a voltage is induced in the winding leg 30c of the rotor winding and this voltage appears across the primary winding of the transformer 27. The component voltage thus produced advances the phase of the resultant voltage applied to one of the pairs of electric valves 16, 17 with respect to the anode voltage and retards the resultant grid voltage with respect to the anode voltage of the other pair of valves, as a result of which current is supplied to the armature of the electric motor 12 in such a direction as to cause the latter to drive the gun 10 in a direction to follow the telescope 11. Assuming the rotation of the telescope 11 to have been in a counterclockwise direction, it may be assumed that the pair of valves 16 is energized and supplies current to the armature of the motor 12 in such a direction as to cause the motor to drive the gun 10 in a counterclockwise direction.

Since the gun 10 is connected through clutch 38 and shaft 37 to the rotor of the receiving device, the rotor winding leg 30c is rotated in the same direction as that in which the magnetic field of the stator winding is rotated. When the telescope 11 is finally trained on the target and at rest, the winding leg 30c approaches a position at right angles with the magnetic field of the stator winding 30a and when this perpendicular relationship is finally reached, the voltage induced in the winding leg 30c again becomes zero and the component voltage supplied to the input circuit of the electric valve apparatus likewise becomes zero. As a result, the resultant grid voltage of the energized pair of electric valves is retarded to the initial phase relationship and electric valve apparatus is, therefore, deenergized and the motor 12 stopped with the gun 10 in correspondence with the telescope 11.

If the telescope 11 is rotated in the opposite direction, the operation is substantially the same as described except that the voltage applied to the transformer 27 is of opposite polarity, and the other pair of valves 17 is, therefore, energized and supplies current to the armature of the motor 12 in the opposite direction so that the gun 10 is driven in the opposite direction to follow the telescope and finally brought to rest in correspondence with the telescope in the manner described in the foregoing paragraph.

In order to disconnect the rotor of the receiving device from the driven object 10, it is only necessary to move the clutch lever 38a in such a direction as to slide the bearing 39 toward the receiver and thus to withdraw the pin from the matched holes in the coupling plates 41, 42. Under this condition, the transmitter and receiver are in correspondence when the winding leg 30c is at right angles with the magnetic field of the stator winding 30a as before and the transmitter and receiver will operate in a well-known manner as a simple motion transmission and indicating system to drive the indicating dial 43 in correspondence with the telescope 11.

To reconnect the load 10 to the receiver regulator, the clutch lever 38a is moved in the opposite direction and if the holes in the plates 41 and 42 in which the pin 40 seats are not lined up, the spring 44 will be compressed. The load 10 may then be jacked over by hand until the holes line up properly, at which time the pin will be forced into place by the spring and the power drive may be resumed.

In the modification of Fig. 2, it is possible to eliminate the transformer 28 of the system of Fig. 1, utilizing a quarter phase winding on the receiver 45. In this modification, the transmitter 46 is in all respects identical with the transmitter 29 of the system of Fig. 1. The single circuit rotor winding 46a of the transmitter is connected to a suitable source of single phase voltage represented by the supply lines 47.

The stator winding 45a of the receiver is a distributed poly-circuit winding and its terminals are connected to corresponding terminals of the poly-circuit stator winding 46b of the transmitter. The rotor winding of the receiver comprises two winding legs 45b and 45c arranged in quarter phase relationship, i. e. at 90°, with respect to each other. The terminals of the winding legs 45b are connected through slip rings to the single phase voltage source 47 and the terminals of the winding leg 45c are connected to the primary winding of a transformer corresponding to the transformer 27 in the system of Fig. 1. With the rotors of the receiver and transmitter in the position illustrated in Fig. 2, the axis of the magnetic field produced by the stator winding of the receiving device is displaced 90° from the axis of the winding 45c so that no voltage is induced therein. Consequently, this is the position of correspondence. If the rotor of the transmitter is turned from the position shown, a voltage will be induced in the winding 45c and the operation of the entire system will be identical with that already described for the system of Fig. 1. The system of Fig. 2 may also be used as an indication unit by providing a clutch between the load and the rotor of the receiver regulator as set forth in the foregoing description in connection with Fig. 1.

A further advantage of the foregoing described system is that the indicating dial 43 will give a true indication of the position of the transmitter without any changes, readjustments or recalibrations, irrespectively of whether the receiver and transmitter are functioning to control the power drive or are merely operating indicating with the receiver rotor disconnected from the load 10.

Although in accordance with the provisions of the patent statutes, this invention is described as embodied in concrete form, it will understood that the apparatus shown and described is merely illustrative and that the invention is not limited thereto since alterations and modifications will readily suggest themselves to persons skilled in the art without departing from the true spirit of this invention or from the scope of the annexed claims.

What I claim as new and desire to secure by Letters Patent of the United States, is:

1. A follow-up control system comprising in combination, a control device, a driven object, a source of alternating voltage, driving means for said object, control means for controlling the supply of power to said driving means, means for supplying a variable control voltage to said control means comprising a transmitting device having a poly-circuit winding and a single circuit winding in inductive relationship therewith energized with single phase voltage from said source, a receiving device having a poly-circuit winding having a portion excited from said source and an unexcited portion connected to said control means, and a poly-circuit winding in inductive relationship therewith and connected to the poly-circuit winding of said transmitting device and mechanical connections between said transmitting device and said control device and between said receiving device and said driven object.

2. A follow-up system comprising in combination with a pilot device and a movable object, a source of alternating voltage, an electric motor for driving said object, means for controlling the supply of electric power to said motor having an input control circuit, means for supplying a variable control voltage to said input circuit comprising a transmitting device actuated by said pilot device and having a poly-circuit winding and a single circuit winding connected to said source and in inductive relationship with said poly-circuit winding and a receiving device mechanically connected to said object and having a poly-circuit winding having a portion excited from said source and an unexcited portion electrically connected to said input circuit and an inductively related poly-circuit winding connected to the poly-circuit winding of said transmitting device.

3. A follow-up system comprising in combination with a pilot device and a movable object, a source of alternating voltage, an electric motor for driving said object, and means responsive to positional disagreement of said device and object for producing a voltage for controlling said motor comprising a transmitting device connected to said pilot device having a poly-circuit winding and a single circuit winding in inductive relationship therewith energized with single phase voltage from said source, a transformer energized from said source and provided with an intermediate tap, and a receiving device connected to said object having a poly-circuit winding connected to the poly-circuit winding of said transmitting device and a poly-circuit winding in inductive relationship therewith having two of its terminals connected to the terminals of said transformer and a third terminal connected to said intermediate tap.

4. Means for reproducing position comprising in combination a pilot device, a movable object, an electric motor for driving said object, means for supplying current to said motor comprising electric valve apparatus provided with an input circuit and an output circuit connected to said motor, a source of single phase alternating voltage, and means responsive to positional disagreement of said device and object for supplying a voltage to said input circuit comprising a transmitting device having a poly-circuit winding and a single circuit winding in inductive relationship therewith energized from said source and a receiving device having a poly-circuit winding having one portion excited from said source and an unexcited portion connected to said input circuit and an inductively related poly-circuit winding connected to the poly-circuit winding of said transmitting device.

5. A follow-up system comprising in combination with a pilot device and a driven object, a source of single phase voltage, a motor for driving said object, means for supplying current to said motor comprising electric valve apparatus provided with an input circuit and an output circuit connected to said motor, a transmitting device connected to said pilot device having a single circuit winding energized from said source and an inductively related poly-circuit winding, a transformer energized from said source and having an intermediate tap, a receiving device connected to said object having a poly-circuit winding connected to the poly-circuit winding of said transmitting device and an inductively related poly-circuit winding having two of its terminals connected to the terminals of said transformer and connections from a third terminal of said last mentioned winding and said intermediate tap for supplying a voltage to said input circuit to cause said motor to drive said object into positional agreement.

6. A follow-up system comprising in combination with a pilot device and a movable object, a source of alternating voltage, an electric motor for driving said object, means for controlling the supply of electric power to said motor, said means being provided with a control circuit, means for supplying a variable control voltage to said control means comprising a transmitting device actuated by said pilot device and having a primary winding connected to said source and an inductively related poly-circuit winding, and a receiving device mechanically connected to said object and having a poly-circuit winding connected to the poly-circuit winding of said transmitting device and an inductively related poly-circuit winding electrically connected to said source and to said control circuit, and means for establishing and interrupting the mechanical connection between said object and receiving device.

7. A follow-up system comprising in combination with a pilot device and a movable object, a source of alternating voltage, an electric motor for driving said object, supply means for said motor comprising electric valve apparatus provided with a control grid, means responsive to positional disagreement of said device and object for supplying a variable control voltage to said grid thereby to control said motor to drive said object toward correspondence with said device comprising a transmitting device actuated by said pilot device having a primary winding energized from said source and an inductively related poly-circuit winding and a receiving device having a rotor and a stator each provided with a poly-circuit winding, one of said windings being connected to the poly-circuit winding of said transmitting device and the other being energized from said source and being electrically connected to said grid, a driving connection between said object and said rotor, and a clutch included in said connection for relative operation of said transmitting and receiving devices as an indicating system and as a regulator for said motor.

8. A follow-up system comprising in combination with a pilot device and a movable object, a source of single phase voltage, an electric motor for driving said object, means for energizing said motor comprising electric valve apparatus provided with an output circuit connected to said motor and an input circuit for controlling the current in said output circuit and means responsive to positional disagreement of said device and object for supplying a voltage to said input circuit to cause said motor to drive said object into positional agreement comprising a transmitting device having a single circuit winding and an inductively related poly-circuit winding and a receiving device having a poly-circuit winding connected to the poly-circuit winding of said transmitting device and an inductively related quarter phase winding having only one leg energized from said source and the other leg connected to said input circuit.

9. Means for reproducing position comprising in combination, a pilot device, a movable object, a source of alternating voltage, an electric motor for driving said object, means provided with a control circuit for controlling the supply of current to said motor, means responsive to positional disagreement of said device and object for supplying a variable control voltage to said control circuit to control said motor comprising a transmitting device actuated by said pilot device having a primary winding energized from said source and an inductively related poly-circuit winding and a receiving device connected to said object having a poly-circuit winding connected to the poly-circuit winding of said transmitting device and an inductively related quarter phase winding having only one of its winding legs energized from said source and the other electrically connected to said control circuit.

10. A follow up control system comprising in combination, a control device, a driven object, a source of alternating voltage, driving means for said object and means for controlling said driving means comprising a transmitting device having a poly-circuit winding and a single circuit winding in inductive relationship therewith energized with single phase voltage from said source, a receiving device having a first poly-circuit winding having a portion excited from said source and an unexcited portion and a second poly-circuit winding in inductive relationship therewith and connected to the poly-circuit winding of said transmitting device, mechanical connections between said control device and said transmitting device and between said driven object and said receiving device and means responsive to voltages induced in said excited portion and in said unexcited portion of said first poly-circuit winding for controlling the energization of said driving means.

11. A follow-up system comprising in combination with a pilot device and a movable object, a source of single phase alternating voltage, driving means for said object, electric means responsive to positional disagreement of said pilot device and driving means for producing a voltage to control said driving means to drive said object into positional agreement with said device comprising a transmitting device actuated by said pilot device and having a poly-circuit winding and a single circuit winding in inductive relationship therewith energized from said source and a receiving device connected to said object having a poly-circuit winding energized from said source and an inductively related poly-circuit winding connected to the poly-circuit winding of said transmitting device and means for establishing and interrupting the connection between said object and receiving device.

12. A follow-up system comprising in combination with a pilot device and a movable object, a source of single phase voltage, an electric motor for driving said object, electronic means responsive to positional disagreement of said device and object for producing a voltage to control said motor to drive said object into positional agreement comprising a transmitting device actuated by said pilot device having a poly-circuit winding and an inductively related single circuit winding energized from said source and a receiving device having a rotor and a stator each provided with a poly-circuit winding, one of said windings being connected to the poly-circuit winding of said transmitting device and the other energized from said source, a driving connection between said object and said rotor, and a clutch included in said connection to provide for selective operation of said transmitting and receiving devices as an indicating system, and as a regulator for said motor.

13. Means for reproducing position comprising in combination a pilot device, a movable object, a source of single phase voltage, an electric motor for driving said object, and electric valve means responsive to positional disagreement of said device and object for producing a voltage to control said motor comprising a transmitting device actuated by said pilot device having a single circuit winding energized from said source and an inductively related poly-circuit winding and a receiving device connected to said object having a poly-circuit winding connected to the poly-circuit winding of said transmitter and an inductively related quarter phase winding having only one of its winding legs energized from said source and the other of said winding legs connected to the input control circuit of said electric valve means.

MARTIN A. EDWARDS.

REFERENCES CITED

The following references are of record in the file of this patent:

UNITED STATES PATENTS

| Number | Name | Date |
| --- | --- | --- |
| 1,890,891 | Vopel | Dec. 13, 1932 |
| 1,559,525 | Murphy et al. | Oct. 27, 1925 |
| 1,937,375 | Woodward | Nov. 28, 1933 |

FOREIGN PATENTS

| Number | Country | Date |
| --- | --- | --- |
| 384,158 | Great Britain | Dec. 1, 1932 |